Sept. 22, 1953   F. W. ZOWASKI   2,652,641
DITCHING KNIFE FOR WHEEL-TYPE DITCH DIGGERS
Filed April 2, 1948   2 Sheets-Sheet 1

Frank W. Zowaski
INVENTOR.

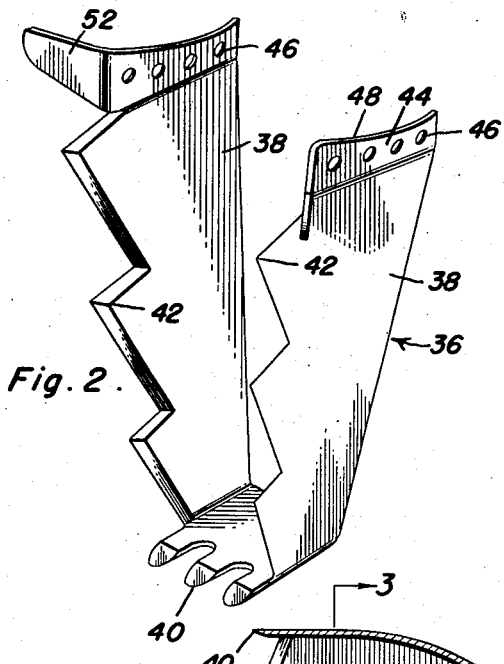
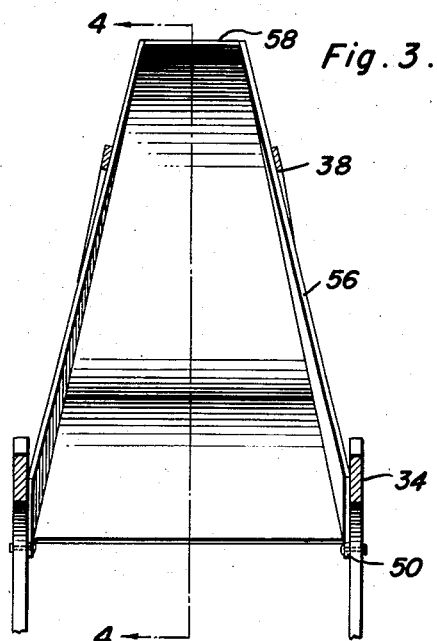
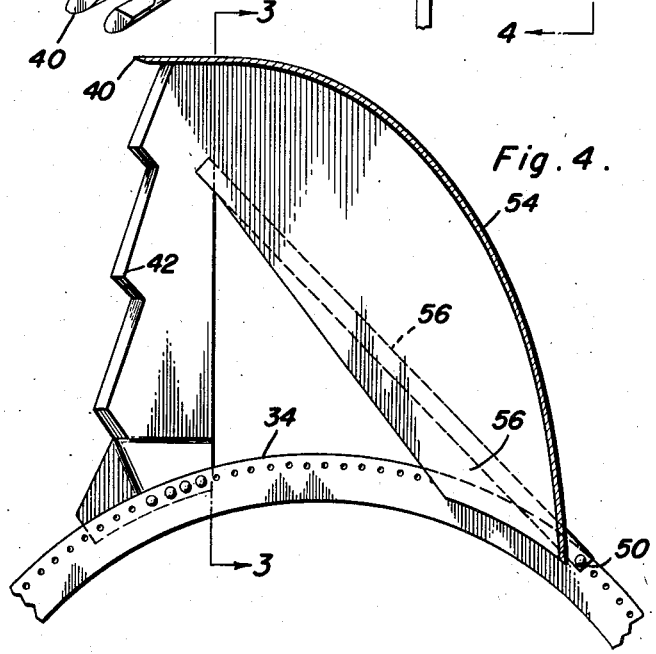

Patented Sept. 22, 1953

2,652,641

UNITED STATES PATENT OFFICE 2,652,641

DITCHING KNIFE FOR WHEEL-TYPE DITCH DIGGERS

Frank W. Zowaski, Wawayanda, N. Y.

Application April 2, 1948, Serial No. 18,541

2 Claims. (Cl. 37—141)

This invention relates to an improved ditching machine and provides an improved ditching knife to cleanly and accurately dig a ditch, and is of special value in mucky places, or in land that is rocky or hard, or in areas of uneven terrain, or the like.

A primary object of the invention is to provide a device that will cut the sides of a ditch cleanly and confine the cut earth to a limited area prior to removal and thereby avoid the usual type of irregular ditch where the cut earth is scattered over the surrounding land in inefficient and undesired manner.

A further object of the invention is to provide a knife that eliminates drag on the rest of the machine to insure accurate operation thereof.

A feature of the invention is the shape of the knife so as to be able to cut the banks of the ditch with both an upward and forward pull, thereby reducing the power needed to achieve the same purpose in other devices and adding more cutting pull.

Another feature of the invention is to provide a knife that includes cutting edges along the sides as well as the bottom in order to obtain a cleanly cut area and at the same time confine the removed dirt to a space within the ditch until it is ready for disposal.

And still another feature of the device is the use of a bucket in proximity to said cutting knives to receive the earth or sand and to retain it thereon until ready for final disposal.

The invention is fully described as will hereinafter appear, in connection with the accompanying drawings, and the scope of the application which will be indicated in the following claims.

In the drawings:

Figure 2 is a perspective view of the cutting knife;

Figure 3 is a transverse sectional view of the device taken on line 3—3 of Figure 4; and Figure 4 is a sectional view of the knife and bucket mounted on the driving means and is taken on line 4—4 of Figure 3.

Figure 1:
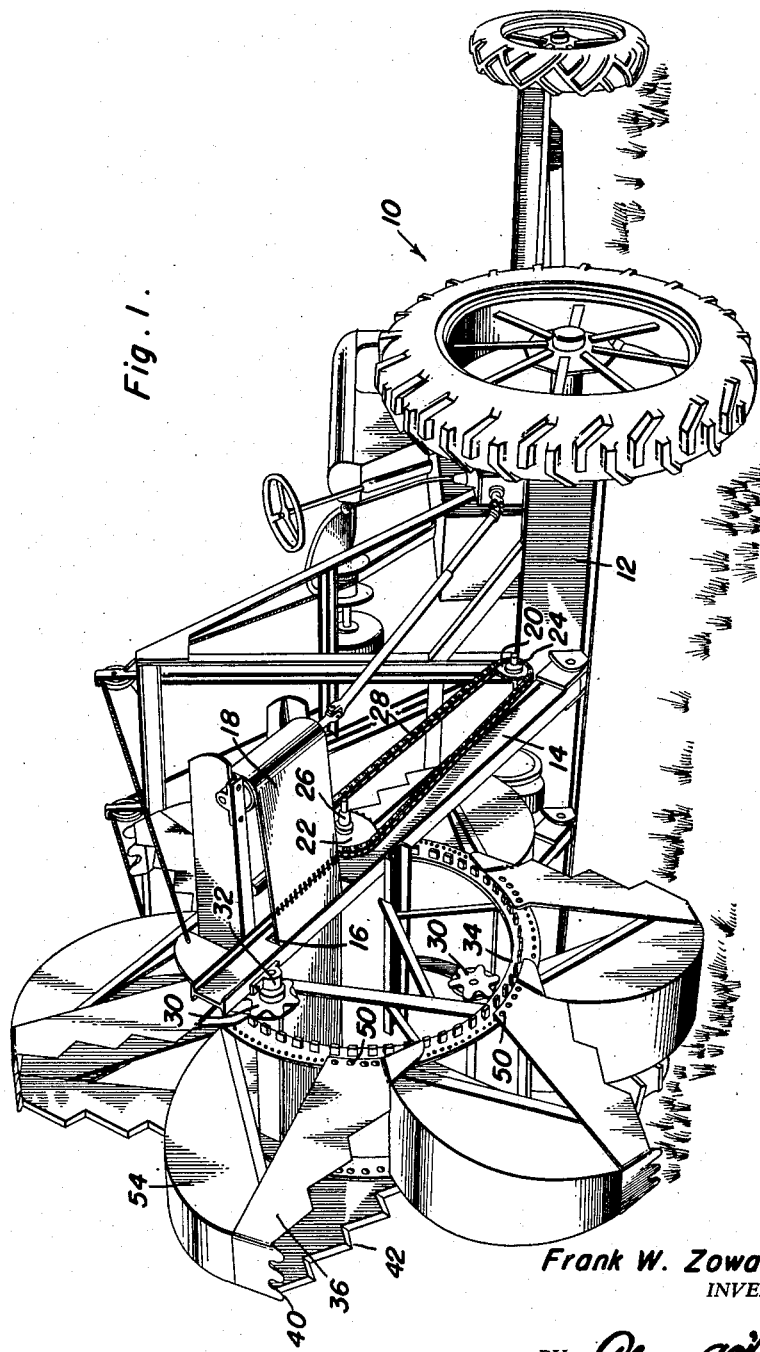
Figure 1 is a side elevation of the knife of the invention attached to a ditching machine.

Referring to Figure 1, there is generally shown a ditching machine 10 of conventional construction and containing a support frame 12 having pivotally and adjustably secured thereon a conveyor support I-beam 14, apertured at 16 to enable a conveyor belt 18 to be operatively mounted thereon. A pair of sprockets 20, 22, mounted on shafts 24, 26, are rotated from the drive means connected to a suitable source of power on the machine (not shown) by means of a sprocket chain 28 trained thereover to rotate conveyor 18. Spur wheels 30, mounted in bearings 32 secured to support 14 engage excavating wheel 34 for rotation thereof. Since this is conventional structure and forms no part of the invention, it is believed that no detailed explanation will be necessary.

Referring to the figures, and Figure 2 particularly, the cutting knife of the invention is generally shown at 36 and is of U-shape including cutting arms 38 in slightly diverging parallel relation, joined transversely by cutting teeth 40. Arms 38 include cutting knives 42 and flanges 44 apertured at 46 and concavely curved at 48 for suitable seating engagement with excavating wheel 34, as by means of rivets 50. A flap 52 on flange 44 extends laterally at an angle to overlie wheel 34.

Suitably secured at one end to cutting knife 36, as by welding or the like, is a bucket or trough 54 of arcuate shape and includes sides 56 which taper rearwardly until transversely joined at 58. Bucket 54 is connected at its other end to wheel 34 by any well known connecting means.

Thus, when the device is in operation, through rotation of excavating wheel 34, teeth 40 pierce and cut the earth or the like in the preliminary steps of making a ditch. As the teeth go deeper, the edges of knives 42 cut and dig the sides and the entire device performs the digging operation without any drag on the remainder of the knife, the only drag being on the front teeth 40. The angular shape of the knife enables it to cut with an upward as well as forward pull, thereby reducing the overall power requirement. As the cut earth is moved upwardly by rotation of knife 36, it falls into buckets 54 to be retained therein until dumped over conveyor 18 for final disposition.

From the above, it is seen that the several objects of the invention are attained and other advantageous results achieved.

Having described the invention, what is claimed as new is:

1. On an excavating wheel, a cutting attachment including a U-shaped cutting knife comprising a pair of substantially parallel cutting arms and a web joining said arms at one set of ends, the other set of ends of said arms being secured to said excavating wheel, said arms having saw toothed cutting edges thereon, a bucket secured to said cutting knife and said excavating wheel and being disposed rearwardly of said cutting knife, said bucket being arcuately shaped and including sides and a bottom, one end of said bottom being secured to the web of said knife and the other end of said bottom being connected to said wheel rearwardly of said knife, the width of said bucket being less than the distance between said arms and the sides of said bucket converging toward one another from the rim of the wheel to the web.

2. On an excavating wheel, a cutting attachment including a U-shaped cutting knife comprising a pair of spaced arms having one set of their ends secured to the rim of said wheel and converging toward one another from said rim, a web joining the other set of ends of said arms, the forward edges of said arms having sawtoothed cutting teeth formed thereon and digging tines formed on the forward edge of said web, a bucket secured to said cutting knife and said wheel and being disposed rearwardly of said knife, said bucket comprising an arcuate bottom connected at one end to said web and at its other end to said wheel at a point rearwardly of said knife, sides on said bucket and said bottom being of decreasing width from said wheel to said web.

FRANK W. ZOWASKI.

References Cited in the file of this patent

UNITED STATES PATENTS

| Number | Name | Date |
|---|---|---|
| 338,678 | Sullivant | Mar. 23, 1886 |
| 711,992 | Mason, Jr. | Oct. 28, 1902 |
| 822,395 | Smith | June 5, 1906 |
| 877,345 | Knox | Jan. 21, 1908 |
| 1,156,291 | Jacobs | Oct. 12, 1915 |
| 1,398,195 | Liggett | Nov. 22, 1921 |
| 1,638,099 | Rorabeck | Aug. 9, 1927 |
| 1,978,732 | Yocum | Oct. 30, 1934 |
| 2,328,715 | Drott | Sept. 7, 1943 |